United States Patent [19]
Hunt et al.

[11] Patent Number: 5,101,972
[45] Date of Patent: Apr. 7, 1992

[54] RECORDING MEDIA STORAGE APPARATUS

[76] Inventors: Ronald E. Hunt; Shari M. Hunt, both of 211 Buck Bend, Georgetown, Tex. 78628

[21] Appl. No.: 708,449

[22] Filed: May 31, 1991

[51] Int. Cl.[5] .................. A47B 81/00; A47F 1/04; G11B 33/02; B65D 85/57
[52] U.S. Cl. .................. 206/307; 206/309; 206/804; 312/15
[58] Field of Search .................. 206/307, 309, 804; 312/9-19

[56] References Cited

U.S. PATENT DOCUMENTS

| | | | |
|---|---|---|---|
| 896,637 | 8/1908 | Herrman | 312/10 |
| 4,702,533 | 10/1987 | Seifert | 312/12 |
| 4,753,343 | 6/1988 | Flynn | 206/307 |
| 4,875,743 | 10/1989 | Gelardi et al. | 312/13 |
| 4,998,618 | 3/1991 | Borgions | 206/307 |

*Primary Examiner*—William I. Price
*Attorney, Agent, or Firm*—Andrew J. Dillon

[57] ABSTRACT

A portable recording media storage apparatus for storing and carrying a number of disc shaped recording media, such as records or compact discs. A housing having a pivotally coupled lower base component and an upper cover component is provided which includes a large number of slots therein for retaining disc shaped recording media in parallel adjacent positions. An axially displaceable selector is mounted to the upper cover component and may be utilized to select and automatically retain a particular disc within the upper cover component during pivotal movement of the upper cover component relative to the lower base component, so that the disc may be readily removed manually from the upper cover component. In this manner a large number of discs may be stored and carried in a substantially smaller volume than previously known storage devices. In a preferred embodiment, a removable transparent cover is provided and may be utilized to cover removable indicia identifying each disc stored within the apparatus.

11 Claims, 5 Drawing Sheets

RECORDING MEDIA STORAGE APPARATUS

BACKGROUND OF THE INVENTION

1. Field of the Invention

The present invention relates in general to storage devices for recording media and in particular to storage devices for storing and carrying disc shaped recording media. Still more particularly, the present invention relates to an apparatus for storing and carrying a large number of disc shaped recording media in a manner which permits the efficient removal of a selected disc.

2. Description of the Prior Art

Storage devices for recording media are generally known. Disc shaped recording media, such as records, or compact discs encounter special problems of handling and storage due to their delicate, flat recorded surfaces. It is therefore preferable to handle disc shaped recording media by their circumferential outer edges which are thin, non-recorded surfaces, in order to avoid damaging the recorded surfaces.

Compact discs generally have optically readable data encoded on their flat recorded surfaces. Compact discs are generally sold in plastic boxes which are sometimes referred to as "jewel boxes." Most compact disc boxes which are utilized to package compact disc for sale are substantially standardized in size and shape. Most are rectangular and have a mounting hub for holding the CD by its center aperture. Compact disc boxes are usually kept after purchases for storage devices for a single compact disc. Other types of storage devices are needed to organize and store multiple compact disc boxes.

While compact disc boxes have proven adequate for storage purposes, there is room for improvement. For example, it is sometimes difficult to remove a compact disc from its mounting hub, thus requiring the use of force which might damage the recorded surface. Also, compact disc boxes have interior surfaces which sometimes come into contact with and thus degrade, the recorded surface of the compact disc.

Presently, there are no storage devices for compact disc boxes which offer a satisfactory portability feature. Due to the thickness of a compact disc box, it is somewhat cumbersome to carry multiple compact disc boxes from one location to another. Existing compact disc box holders are intended for stationary use, and thus, are not easily converted to portable use.

U.S. Pat. No. 4,702,533 describes a device for storing flat recording media in which compact discs are vertically stacked in outwardly sliding, open-topped trays. Each tray is composed of a lower portion of the original compact disc box, which is slidable along parallel lateral guide rails. A locking mechanism is provided to prevent the trays from inadvertently sliding out. However, the device described in the aforementioned patent is not practical as a portable carrier, since space for each compact disc box is required. Also, sliding tray mechanisms tend to be mechanically complex and quite costly to produce.

More recently, U.S. Pat. No. 4,875,743 disclosed an apparatus for storing a plurality of disc shaped recording media which includes a housing and a plurality of thin substantially C-shaped lever members, each of which has an inner circumferential surface for holding a disc shaped recording media by an outer circumferential surface of the recording media. Each lever member is pivotally connected to the housing by a pivot post and is pivotally movable into and out of the housing. A lock mechanism prevents the lever members from pivoting out of the housing, while a detent mechanism holds the unlocked lever in either a closed or opened position. This device represents an advance over the previously discussed device; however, it is necessary to manufacture a separate housing for each compact disc which must then be pivotally mounted within the storage apparatus of the aforementioned patent.

Thus, it should be apparent that a need exists for a storage apparatus which can efficiently store a large number of disc shaped recording media, such as compact discs, and for transportation from place to place.

SUMMARY OF THE INVENTION

It is therefore one object of the present invention to provide an improved apparatus for storing recording media.

It is another object of the present invention to provide an improved apparatus for storing and carrying disc shaped recording media.

It is yet another object of the present invention to provide an improved apparatus for storing and carrying a large number of disc shaped recording media in a manner which permits the efficient removal of a selected disc from a plurality of discs.

The foregoing objects are achieved as is now described. The portable recording media storage apparatus of the present invention may be utilized to store and carry a large number of disc shaped recording media, such as records or compact discs. A housing having a pivotally coupled lower base component and an upper cover component is provided which includes a large number of slots therein for retaining disc shaped recording media in parallel adjacent positions. An axially displaceable selector is mounted to the upper cover component and may be utilized to select and automatically retain a particular disc within the upper cover component during pivotal movement of the upper cover component relative to the lower base component, so that the disc may be readily removed manually from the upper cover component. In this manner a large number of discs may be stored and carried in a substantially smaller volume than previously known storage devices. In a preferred embodiment, a removable transparent cover is provided and may be utilized to cover removable indicia identifying each disc stored within the apparatus.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
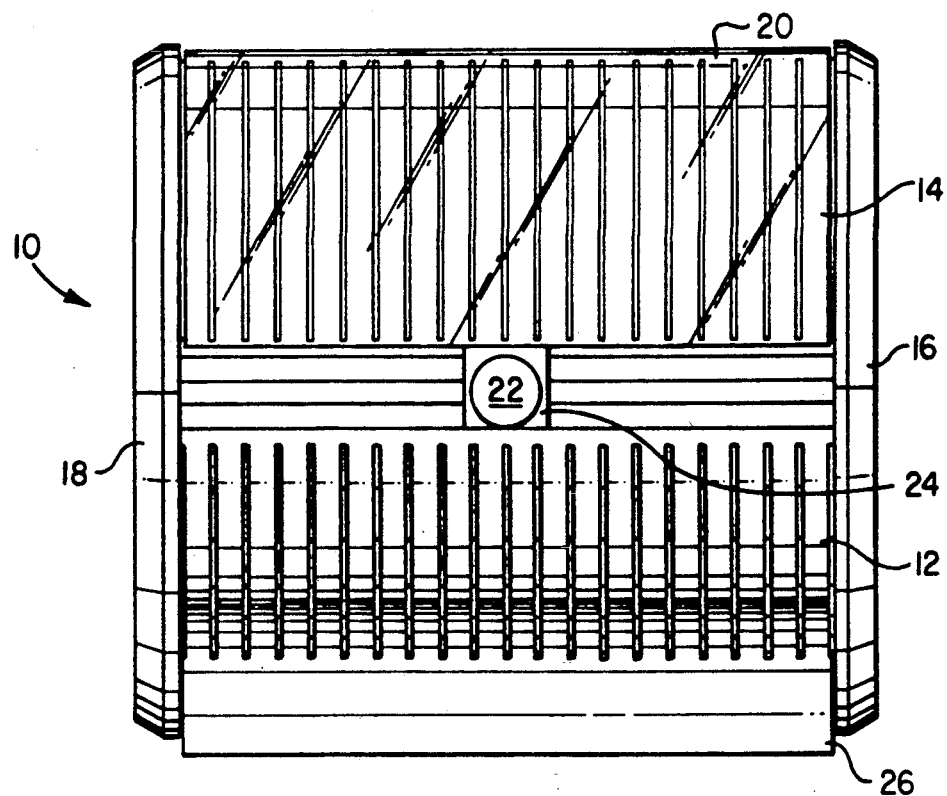
FIG. 1 is a front view of the novel disc storage apparatus of the present invention.

With reference now to the figures and in particular with reference to FIG. 1, there is depicted a front view of novel disc storage apparatus 10 of the present invention. As illustrated, disc storage apparatus 10 includes a lower base component 12 and an upper cover component 14. Lower base component 12 and upper cover component 14 are preferably substantially identical for ease in construction and lower base component 12, together with upper cover component 14, are utilized to form a generally cylindrical storage apparatus of dimension slightly larger than the disc shaped recording media to be stored. End plates 16 and 18 cooperate with lower base component 12 and upper cover component 14 to fully enclose the cylindrical storage space defined thereby.

Also depicted within FIG. 1 is transparent label cover 20. Transparent label cover 20 is preferably constructed of a transparent plastic material such as LEXAN, a registered trademark of General Electric, Inc. Transparent label cover 20 may be utilized to protect a plurality of indicia mounted thereunder which are preferably utilized to identify each disc shaped recording media stored within disc storage apparatus 10.

Also depicted within FIG. 1 is selector knob 22 which is mounted within selector housing 24. Selector 22 knob may be utilized, in a manner which will be explained in greater detail herein, to select and automatically retain a particular one of a plurality of disc shaped recording media within upper cover component 14 while the remainder of the plurality of disc shaped recording media within disc storage apparatus 10 remain within lower base component 12, during pivotal movement of upper cover component 14 with respect to lower base component 12. Two separate columns of indicia are preferably provided upon upper cover component 14 with staggered index marks such that selector knob 22 may be aligned with indicia within either column.

Figure 2:
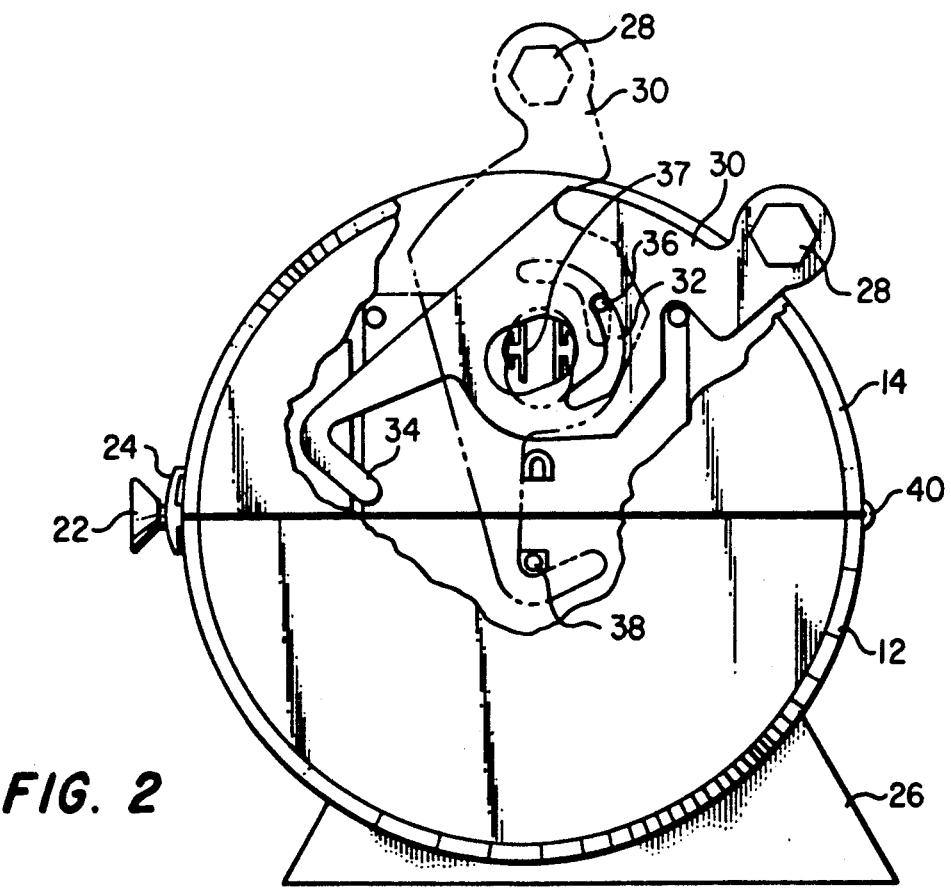
FIG. 2 is a partially cut away side view of the novel disc storage apparatus of FIG. 1, illustrating the operation of the handle thereof.

Referring now to FIG. 2, there is depicted a partially cut away side view of novel disc storage apparatus 10 of the present invention which illustrates the operation of the handle thereof. As depicted within FIG. 2, disc storage apparatus 10 preferably includes a base 26 which may be formed in any shape suitable for providing a flat surface upon which disc storage apparatus 10 may rest. A carrying handle 28 is preferably mounted longitudinally along the upper surface of upper cover component 14 by means of two identical handle brackets 30.

As illustrated, handle bracket 30 preferably includes a handle bracket slot 32 which cooperates with pivot cam 36 and pivot 37 to permit handle 28 to rotate to the position depicted in phantom within FIG. 2. Handle bracket 30 also includes a handle bracket hook 34 which cooperates with lock cam 38 such that when handle 28 is raised to the uppermost vertical position, as depicted in phantom within FIG. 2, lower base component 12 is prevented from pivoting with respect to upper cover component 14, effectively maintaining disc storage apparatus 10 in a closed position.

Of course, those skilled in the art will appreciate that handle 28 is preferably supported by a pair of handle brackets 30, an identical handle bracket 30 being present within the opposite end plate of disc storage apparatus 10.

Figure 3:
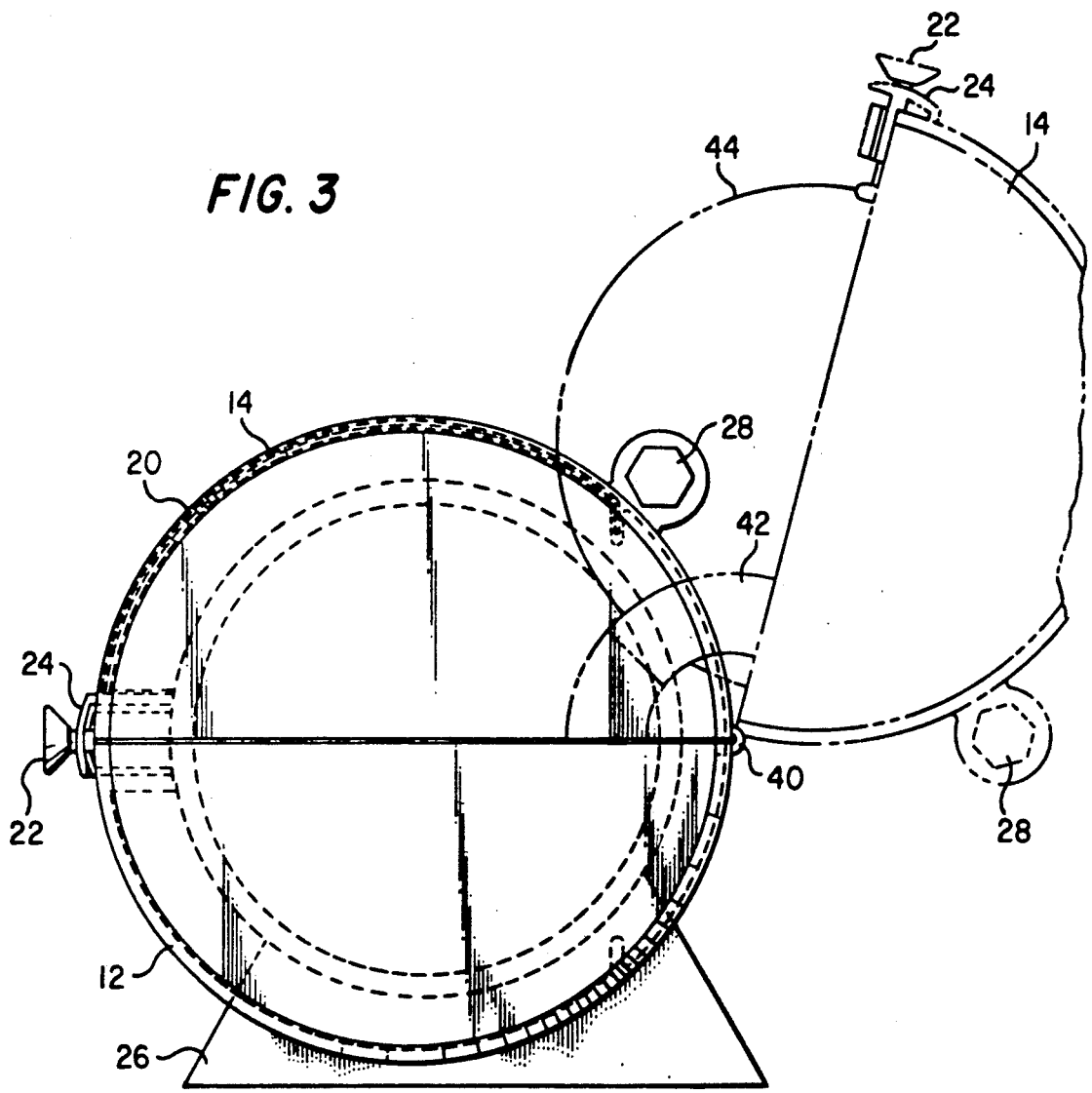
FIG. 3 is a side view of the novel disc storage apparatus of the present invention illustrating the removal of a single disc therefrom.

With reference now to FIG. 3, there is depicted a side view of novel disc storage apparatus 10 of the present invention illustrating the removal of a single disc therefrom. As illustrated, upper cover component 14 may be pivoted with respect to lower base component 12 by means of hinge 40. Hinge 40 is preferably a suitable hinge which is designed to withstand the wear and tear disc storage apparatus 10 may encounter and, hinge limiter 42 is utilized to restrict the pivotal movement of upper cover component 14 with respect to lower base component 12, in the manner depicted. As will be explained in greater detail herein, hinge limiter 42 preferably comprises upper hinge limiter 42a and lower hinge limiter 42b which are joined in a manner which will be depicted below.

Still referring to FIG. 3, selector knob 22, within selector housing 24 is effective to select a particular disc 44 and retain disc 44 within upper cover component 14 during pivotal movement of upper cover component 14 with respect to lower base component 12. Thus, upon reference to FIG. 3 those skilled in the art will appreciate that a selected disc 44 may then be manually removed from upper cover component 14 while the remaining disc shaped storage media are stored within lower base component 12.

The manner in which selector knob 22 cooperates to select and retain disc 44 within upper cover component 14 will be explained in greater detail below.

Figure 4:
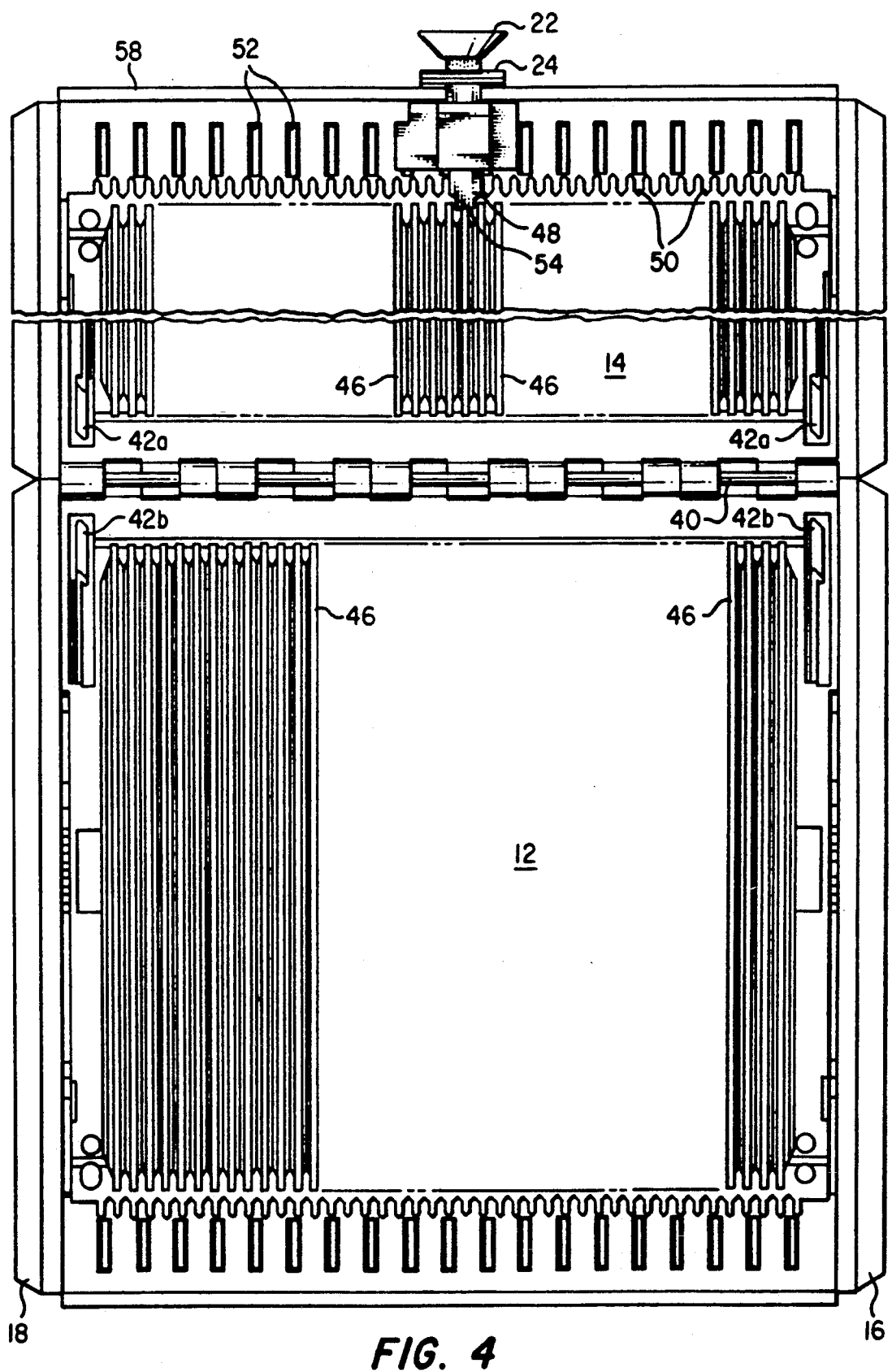
FIG. 4 is a partial plan view of the interior of the novel disc storage apparatus of the present invention.

Referring now to FIG. 4, there is depicted a partial plan view of the interior of novel disc storage apparatus 10 of the present invention. As illustrated, disc storage apparatus 10 includes a plurality of storage slots 46, each of which is suitable sized to receive the circumferential edge of a disc shaped recording media, such as a compact disc. Thus, upon reference to FIG. 4, those skilled in the art will appreciate that a large number of disc shaped recording media, such as compact discs, may be stored within disc storage apparatus 10 by placing each compact disc within an associated slot 46. In a depicted embodiment of the present invention, forty slots 46 are provided, not all of which are illustrated within FIG. 4.

Next, the manner in which a particular disc 44 may be selected and retained within upper cover component 14 is illustrated. As depicted within FIG. 4, a selector plunger 48 is provided and is fixedly attached to selector knob 22. Selector plunger 48 includes a gripping surface 54 which may be aligned with a selected slot 46 to retain a disc 44 within upper cover component 14.

As illustrated within FIG. 4, the selector mechanism is mounted within a selector housing 24 which is slidably mounted to compartment lip 58 and which may be aligned with a selected slot 46 within upper cover component 14 by means of detent slots 50 which cooperate with detent teeth 62 (not shown) on the lower surface of selector plunger 48 to ensure that gripping surface 54 aligns accurately with a particular slot 46 within upper cover component 14. Alignment surfaces 52 are also provided and are utilized, in a manner well known in the art, to maintain the alignment of selector housing 24 during axial movement along compartment lip 58.

Also depicted within FIG. 4 are a pair of hinge limiters 42a and 42b which may be linked together cooperatively to form hinge limiter 42, as depicted in FIG. 3. Those skilled in the art will appreciate that each hinge limiter 42a includes an angled end which cooperates with an angled end of each hinge limiter 42b to link these elements together.

Figure 5:
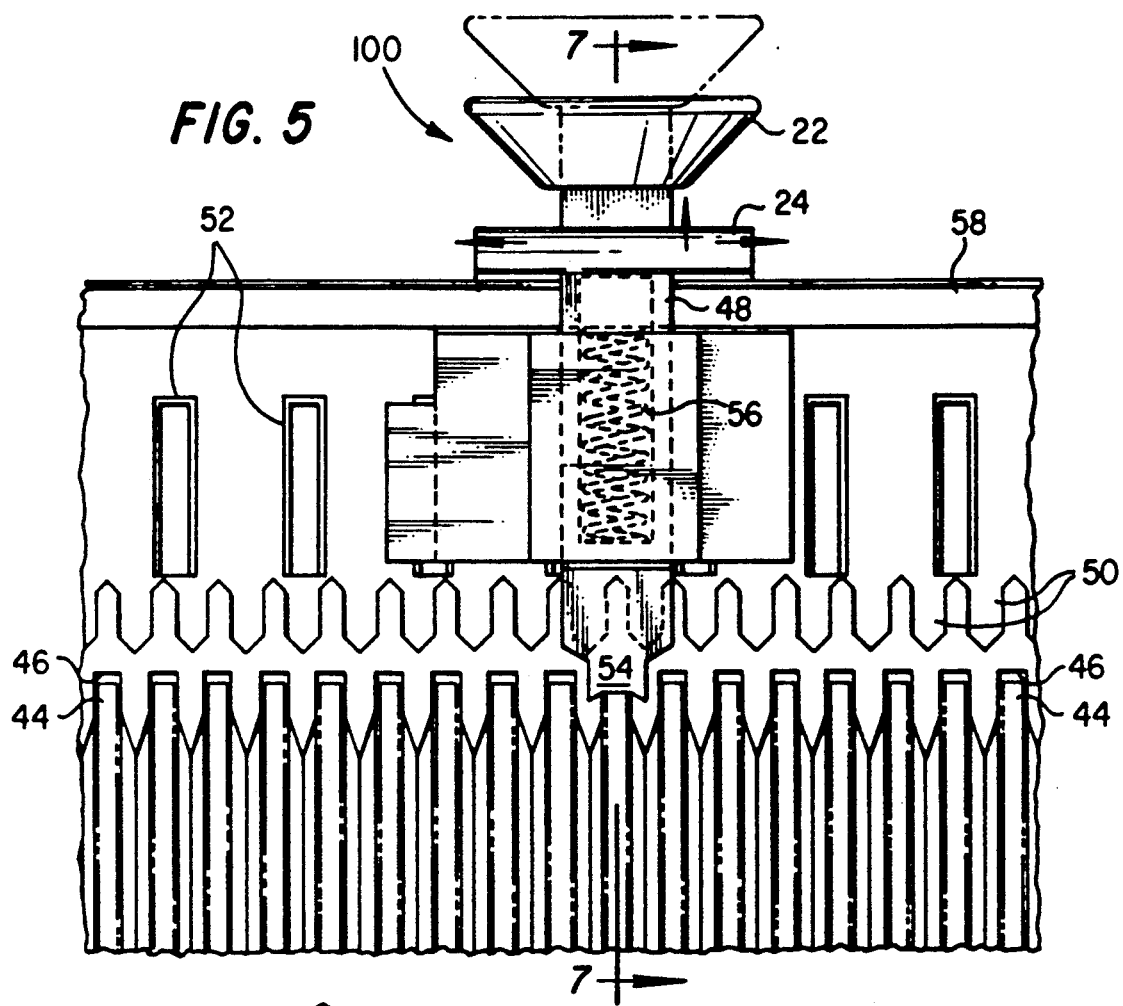
FIG. 5 is a detailed view of the disc selector mechanism of the novel disc storage apparatus of the present invention.

With reference now to FIG. 5, there is depicted a detailed view of the disc selector mechanism 100 of novel disc storage apparatus 10 of the present invention. As illustrated, each slot 46 now contains a disc 44. Selector housing 24 is longitudinally slidably mounted to compartment lip 58 and, selector plunger 48 is movable into and out of selector housing 24 in the manner depicted. A spring 56 is utilized to provide bias urging selector plunger 48 downward such that gripping surface 54 is pressed into an abutting relationship with a disc 44 within a slot 46, so that a selected disc 44 may be selected and retained within upper cover component 14.

A pair of detent teeth on the lower surface of selector plunger 48 cooperate with associated detent slots 50 to ensure that gripping surface 54 accurately aligns with each selected compact disc. Thus, a particular disc may be selected and automatically retained within upper cover component 14 during pivotal movement of upper cover component 14 with respect to lower base component 12 by grasping selector knob 22 and pulling selector knob 22 away from selector housing 24, against the bias provided by spring 56, such that gripping surface 54 is withdrawn from contact with a disc 44 within a slot 46. By withdrawing selector knob 22 from selector housing 24, the detent teeth (not shown) on the lower surface of selector plunger 48 are removed from a slotted relationship with detent slots 50 and selector housing 24 may then be moved longitudinally to a position corresponding to a selected compact disc 44.

Thus, a particular disc may be identified by means of indicia on the outer surface of upper cover component 14 and by moving selector mechanism 100 into alignment with that indicia in the manner described above, the selected disc may be gripped and retained within upper cover component 14 during pivotal movement of upper cover component 14 with respect to lower base component 12.

Figure 6:
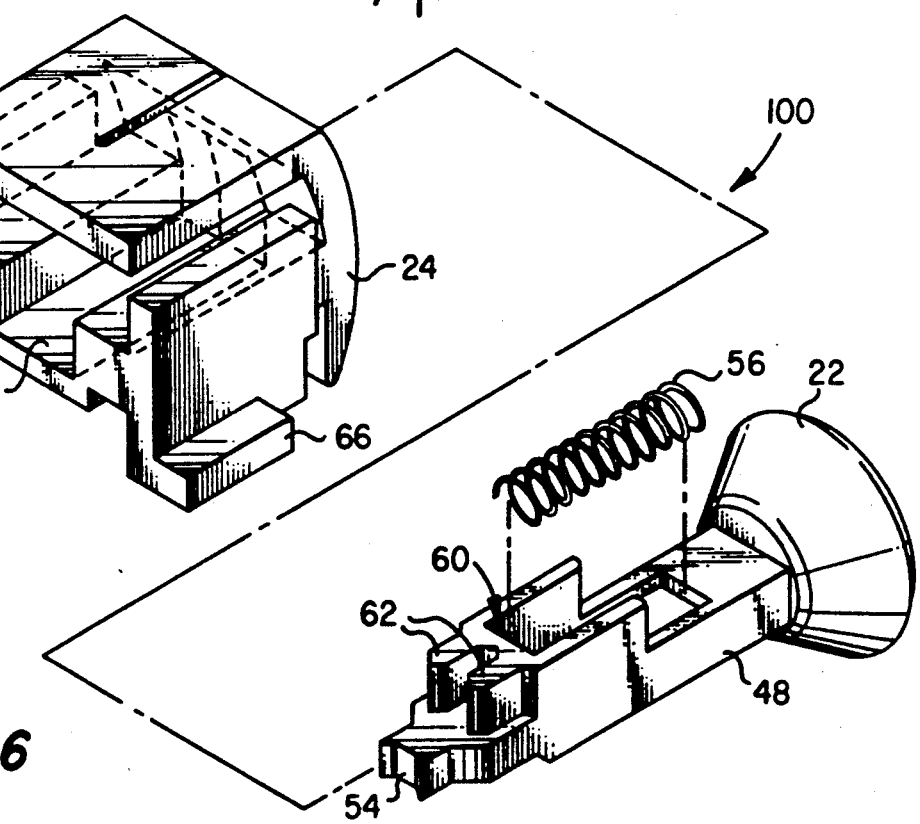
FIG. 6 is an exploded view of the disc selector mechanism illustrated within FIG. 5.

Referring now to FIG. 6, there is depicted an exploded view of disc selector mechanism 100. As may be seen, selector housing 24 includes a plunger slot 64 which is adapted to receive selector plunger 48. Selector plunger 48 is preferably fixedly mounted to selector knob 22 and includes a spring mounting slot 60 which is adapted to receive spring 56. A pair of detent teeth 62 are provided on the lower surface of selector plunger 48 and act in cooperation with detent slots 50 to ensure that gripping surface 54 is aligned accurately with the outer circumferential edge of a disc 44 within a slot 46.

One end of spring 56 is preferably placed in a mated relationship with the closed end of spring mounting slot 60 while the other end of spring 56 is placed against compartment lip 58. Thus, when selector plunger 48 is placed within plunger slot 64 of selector housing 24, and the selector housing is slidably mounted to compartment lip 58, the expansive force of spring 56 will serve to urge gripping surface 54 into contact with an outer circumferential edge of a disc 44 within a slot 46 until such time as selector knob 22 is manually withdrawn from selector housing 24 this action serves to release a disc 44 and permits selector housing 24 to be axially relocated to a new selected disc location.

Another important feature of selector housing 24 is illustrated at reference numeral 66. Reference numeral 66 depicts a lock tab which cooperates with a compartment lip of lower base component 12 to restrict pivotal movement of upper cover component 14 with respect to lower base component 12 when selector housing 24 is longitudinally moved to a leftmost position within FIG. 1.

Figure 7:
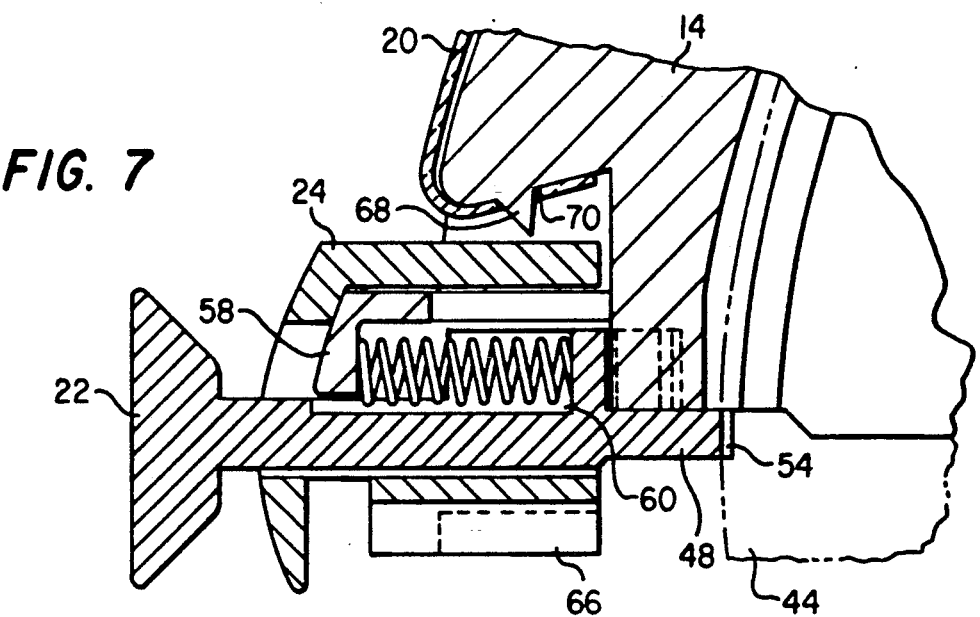
FIG. 7 is a sectional view of the disc selector mechanism of FIG. 5 taken along line 7—7 thereof.

With reference now to FIG. 7, there is depicted a sectional view of disc selector mechanism 100 of FIG. 5, taken along line 7—7 thereof. As illustrated, spring 56 is compressibly mounted within spring mounting slot 60 and is effectively compressed between spring mounting slot 60 and compartment lip 58. In this manner, selector plunger 48 is urged inward such that gripping surface 54 contacts the outer circumferential edge of a selected disc 44 within disc storage apparatus 10. By manually withdrawing selector knob 22 from selector housing 24, spring 56 is compressed and gripping surface 44 moves out of contact with the outer circumferential edge of a selected disc 44. When selector knob 22 is withdrawn sufficiently, such that detent teeth 62 (see FIG. 6) no longer form a slotted relationship with detent slots 50 (see FIG. 5), selector housing 24 may be longitudinally moved along compartment lip 58 to permit any desired compact disc 44 within disc storage apparatus 10 to be selected.

Also depicted within FIG. 7 is a portion of transparent label cover 20. As illustrated, upper cover component 14 includes a protrusion 68 which is adapted to mate with an aperture 70 within transparent label cover 20. Thus, transparent label cover 20 may be selectively removed from disc storage apparatus 10 to permit indicia identifying those compact discs stored therein to be altered.

Figure 8:
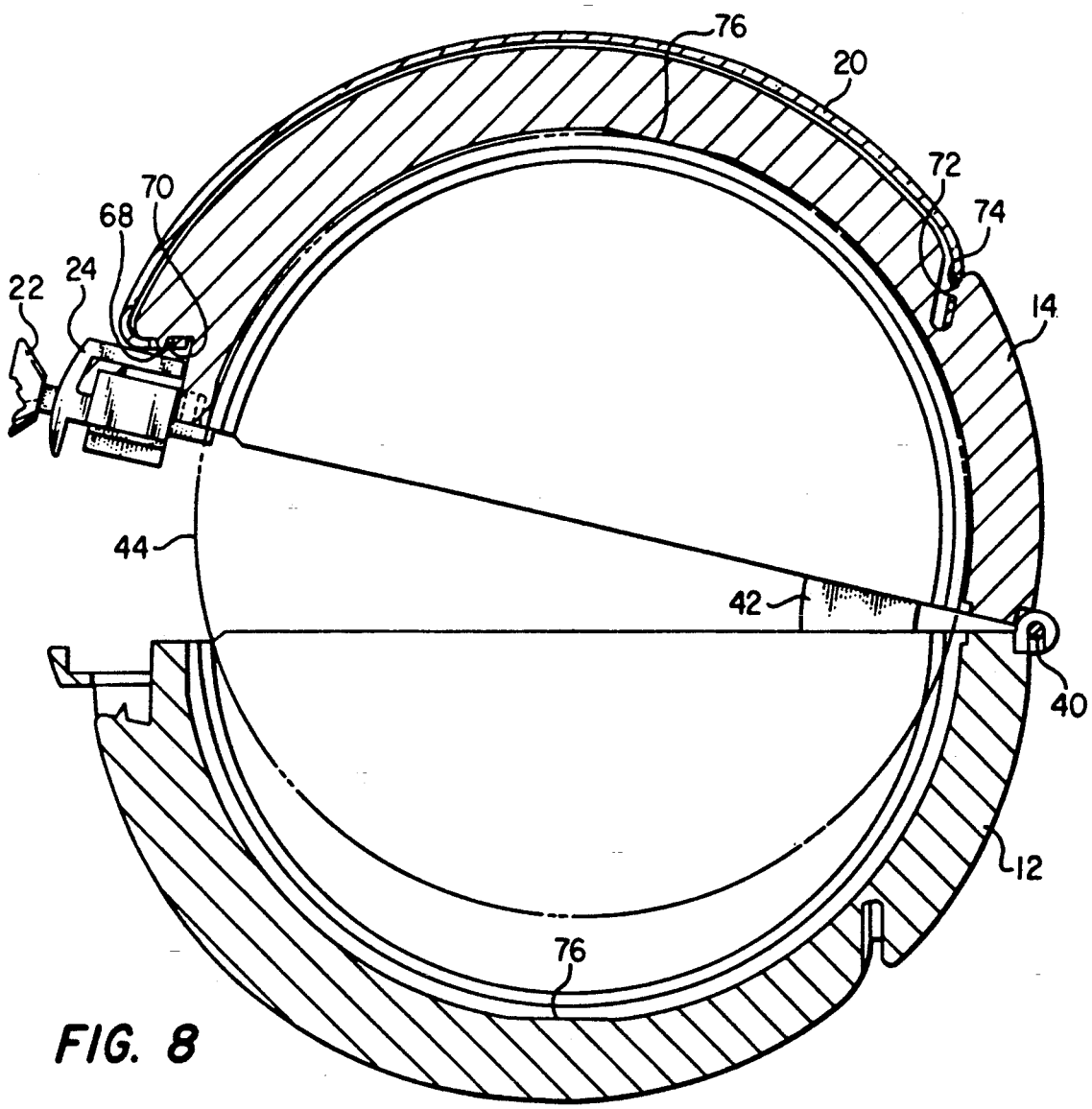
FIG. 8 is a partial sectional view of the novel disc storage apparatus of the present invention.

Finally, with reference to FIG. 8, there is depicted a partial sectional view of the novel disc storage apparatus 10 of the present invention. As illustrated, transparent label cover 20 includes a second aperture 74, which is adapted to mate with a protrusion 72 at the rear of upper cover component 14, such that transparent label cover 20 may be fixedly mounted in the position depicted with respect to upper cover component 14 in order to protect indicia identifying those disc shaped storage media stored within disc storage apparatus 10.

One final feature of the disc storage apparatus 10 is illustrated with respect to FIG. 8. Within upper cover component 14 and lower base component 12 a flat surface 76 is provided within each slot 46 (see FIG. 4) such that a compact disc 44 will not fit too snugly within a slot 46, thereby preventing its removal utilizing gripping surface 54 of disc selector mechanism 100.

Upon reference to the foregoing, those skilled the art will appreciate that the Applicants herein have provided a novel disc shaped recording media storage apparatus which permits a plurality of discs to be stored in closely spaced parallel relationship such that manual removal of a selected disc stored therein might be rendered difficult. The novel disc storage apparatus of the present invention includes a disc selector mechanism which may be utilized to selectively grasp and automatically retain a particular disc from within the plurality of discs within the upper cover component during pivotal movement of the upper cover component with respect to the lower base component, thereby rendering removal of the selected disc manually possible. Thus, the problem normally associated with densely stored disc shaped storage media is overcome by the novel design of the present invention.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. An apparatus for storing and carrying a plurality of disc-shaped recording media, each having an outer circumferential edge, said apparatus comprising:
    portable housing means including a lower base component and an upper cover component;
    means for pivotally coupling said lower base component and said upper cover component;
    slot means within said portable housing means for retaining a plurality of said disc shaped recording media in a plurality of parallel adjacent positions; and
    disc selector means for selecting and automatically retaining a particular one of said plurality of disc-shaped recording media within said upper cover component while the remainder of said plurality of disc-shaped recording media remain within said lower base component during pivotal movement of said upper cover component with respect to said lower base component.

2. The apparatus for storing and carrying a plurality of disc-shaped recording media according to claim wherein said disc selector means includes a gripping surface adapted to abut an outer circumferential edge of a particular one of said plurality of disc-shaped recording media.

3. The apparatus for storing and carrying a plurality of disc-shaped recording media according to claim 2, further including biasing means for urging said gripping surface into an abutting relationship with an outer circumferential edge of a particular one of said plurality of disc-shaped recording media.

4. The apparatus for storing and carrying a plurality of disc-shaped recording media according to claim 2, wherein said disc selector means includes alignment means for aligning said gripping surface into an abutting relationship with an outer circumferential edge of a particular one of said plurality of disc-shaped recording media.

5. The apparatus for storing and carrying a plurality of disc-shaped recording media according to claim 4, wherein said alignment means comprises a plurality of detent slots disposed along one edge of said upper cover component and at least one detent tooth disposed upon said disc selector means for interacting in cooperation with a selected one of said plurality of detent slots.

6. The apparatus for storing and carrying a plurality of disc-shaped recording media according to claim 1, further including a removable transparent cover adapted to be mounted to said upper cover component wherein indicia identifying each of said plurality of disc-shaped recording media may be selectively mounted thereunder.

7. The apparatus for storing and carrying a plurality of disc-shaped recording media according to claim 1, further including a handle pivotally mounted to said upper cover component for permitting said apparatus to be manually carried.

8. The apparatus for storing and carrying a plurality of disc-shaped recording media according to claim 7, further including a cam surface mounted within said lower base component and a cooperative handle bracket mounted to said handle wherein pivotal movement of said upper cover component and said lower base component may be selectively restricted by interaction therebetween.

9. The apparatus for storing and carrying a plurality of disc-shaped recording media according to claim 3, wherein said biasing means comprises a spring mounted within said disc selector means.

10. The apparatus for storing and carrying a plurality of disc-shaped recording media according to claim 1, wherein said portable housing means is constructed of a plastic material.

11. The apparatus for storing and carrying a plurality of disc-shaped recording media according to claim 6, wherein said removable transparent cover is constructed of a plastic material.

* * * * *